T. L. BURTON.
BRAKE HEAD CONNECTION.
APPLICATION FILED SEPT. 15, 1916.
1,314,853.
Patented Sept. 2, 1919.
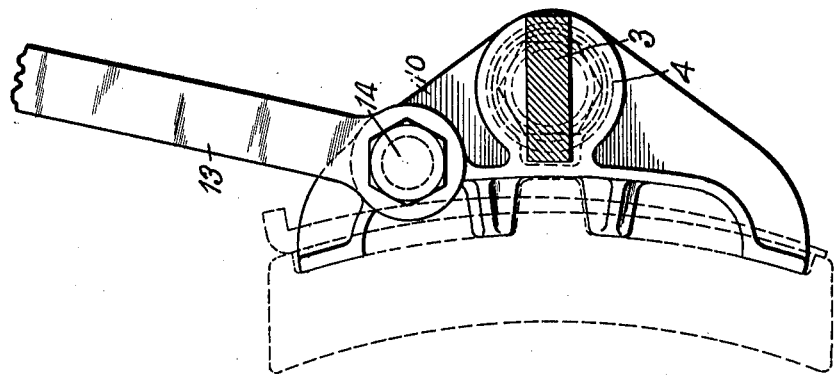
-FIG. 2-
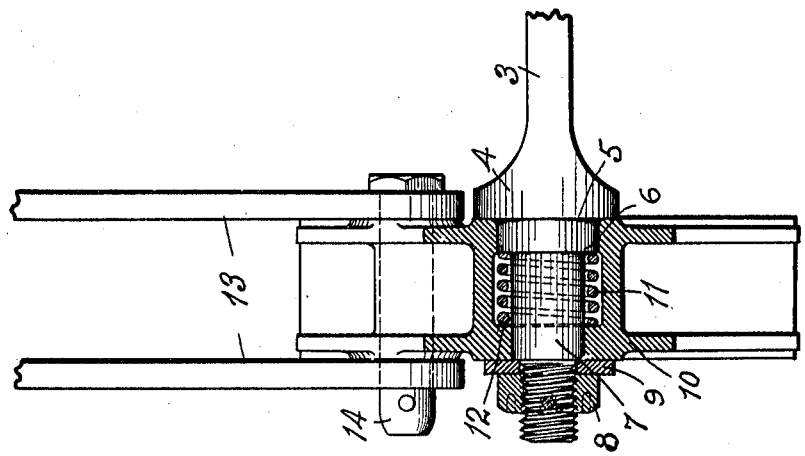
-FIG. 1-
INVENTOR
Thomas L. Burton
by Edward A. Wright
Atty.

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-HEAD CONNECTION.

1,314,853.     Specification of Letters Patent.     Patented Sept. 2, 1919.

Application filed September 15, 1916. Serial No. 120,228.

*To all whom it may concern:*

Be it known that I, THOMAS L. BURTON, a citizen of the United States, residing at St. Louis, in the State of Missouri, have invented a certain new and useful Improvement in Brake-Head Connections, of which improvement the following is a specification.

This invention relates to connections between brake heads and brake beams, and has for its object to provide a simple and durable construction of this character wherein the brake head is mounted on the end of the brake beam, with the capacity of a partial rotary movement relative thereto, and having a certain amount of frictional resistance between the parts, whereby the brake head may be maintained in the desired position relative to the wheel as the brake shoe wears.

In the accompanying drawing: Figure 1 is a longitudinal sectional view, taken through a joint connection embodying my improvement; and Fig. 2, a transverse section of the brake beam, and showing the brake head and hanger in elevation.

According to the construction shown, the brake beam, 3, is provided with a hub portion, 4, having shoulders, 5 and 6, and a trunnion, 7, adapted to extend through the brake head and being threaded at its end for the reception of a nut, 8, and washer 9. The brake head, 10, is rotatably mounted on the trunnion, 7, and shoulder, 6, and is provided with a chamber, in which is located the coiled spring, 11, between the shoulder, 6, and a shoulder, 12, on the brake head. As the nut, 8, is screwed up, the brake head is clamped between the washer, 9, and the shoulder, 5, of the brake beam, the spring, 11, being compressed and exerting sufficient pressure against the brake head to produce a certain amount of frictional resistance to a relative turning movement between the brake head and the brake beam. The brake head may also have a separate hanger, 13, pivotally connected thereto by a pin, 14, at a point above the trunnion.

It is important that the brake shoe should be maintained in a position substantially concentric with the wheel, both when applied and when released, and as the shoe wears it will be apparent that the brake head will necessarily swing through a longer arc in its application and release movement, and consequently its position relative to the brake beam should be adjusted to maintain the concentric relation with the wheel. This adjustment is automatically obtained in my improved construction, since the force of the application in pressing the shoe against the wheel will cause a slight turning movement of the brake head upon its trunnion, overcoming the frictional resistance produced by the spring. The parts will remain in this position relative to each other until again adjusted by the application to the wheel after a further wear of the brake shoe. The spring also takes up the wear of the joint and prevents the parts from rattling or becoming loose.

The inclosing wall of the chamber containing the spring, 11, also serves to protect said spring and provides a lateral support between the flanges of the brake head. It will be apparent, however, that this wall may be omitted if desired.

It is well known that the wearing surface or tread of the ordinary car wheel to which the brake shoe is applied, is not exactly cylindrical in form, but is more or less conical, or tapered from the wheel flange to the outer side; consequently when the brake is applied, the force tends to slide the brake head outward on the wheel surface. It is, therefore, important that the friction member or washer should be mounted at the outer end of the trunnion in order that this lateral pressure exerted upon the brake head shall coöperate with the spring to produce greater friction between said washer and the brake head, and thereby maintain the frictional resistance sufficient at all times and under the varying conditions of wear to hold the brake head in its adjusted position on the trunnion.

Having now described my invention, what

I claim as new and desire to secure by Letters Patent is:

In a brake head connection, the combination of a brake beam having a shoulder and a trunnion at its end, a brake head rotatably mounted on said trunnions, a friction member mounted at the outer end of the trunnion and bearing against the brake head, and a spring acting between said shoulder and the brake head to produce frictional resistance between said brake head and the friction member to hold the head in any position relative to the beam, to which it may be turned by its application to the wheel.

THOMAS L. BURTON.

Copies of this patent may be obtained for five cents each, by addressing the "Commissioner of Patents, Washington, D. C."